Nov. 23, 1926.

A. FRANCHETTI 1,608,095

FUEL PUMP FOR INTERNAL COMBUSTION ENGINES

Filed May 3, 1924 6 Sheets-Sheet 1

Inventor
Alessandro Franchetti
per [signature]
Attorney

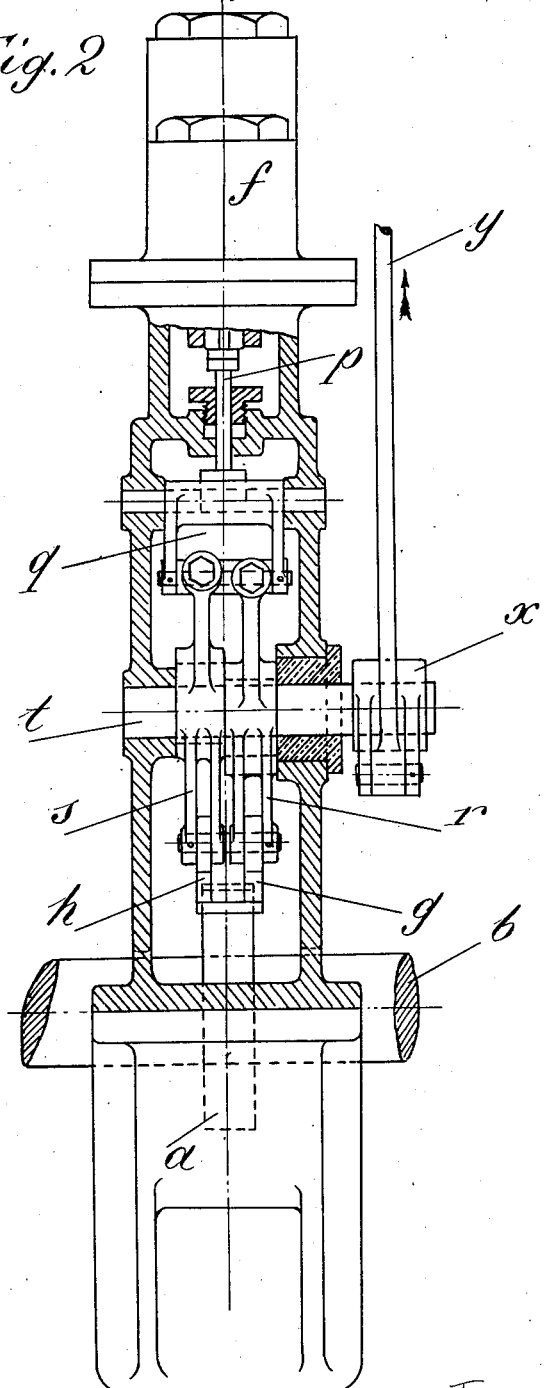

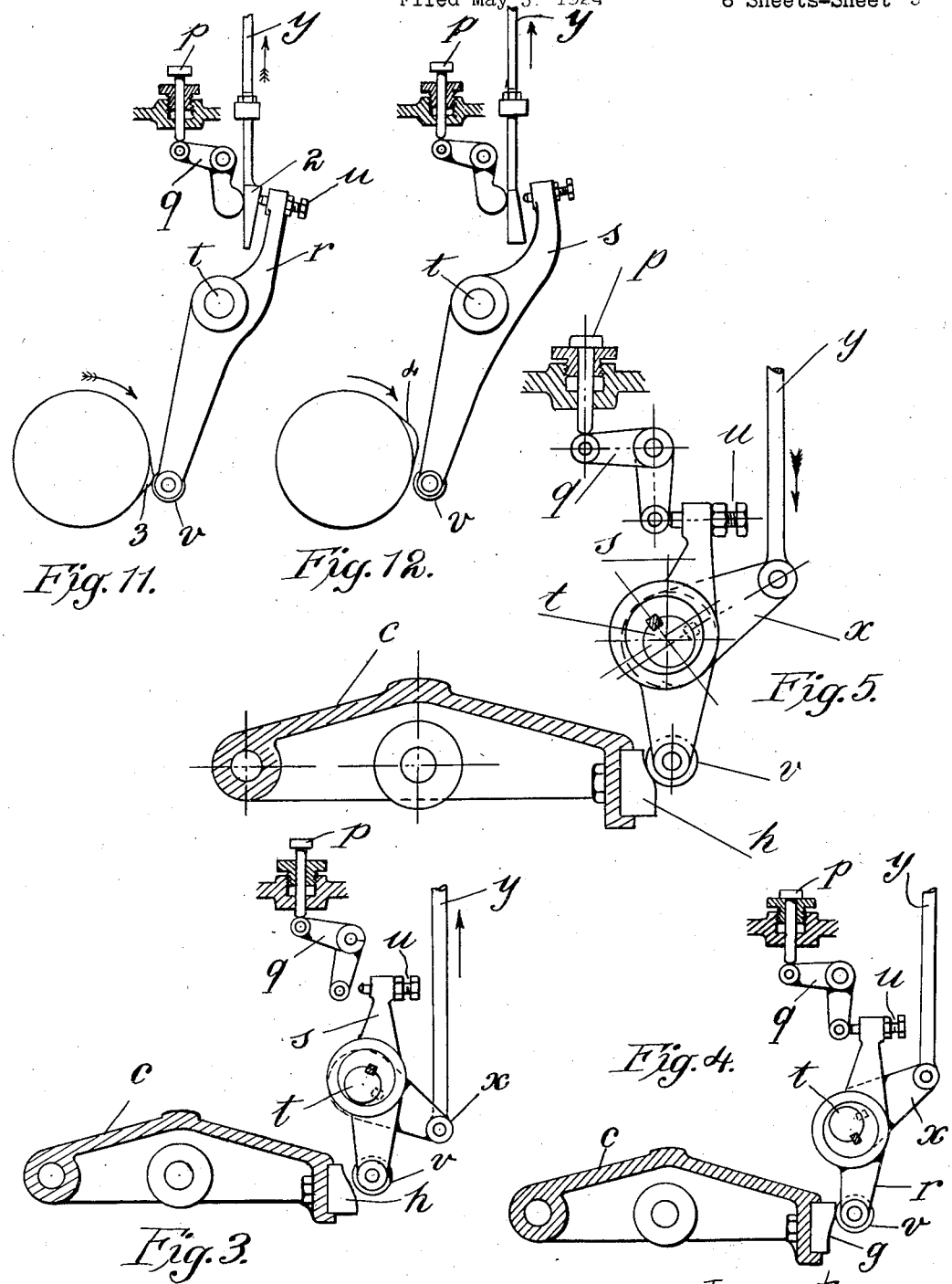

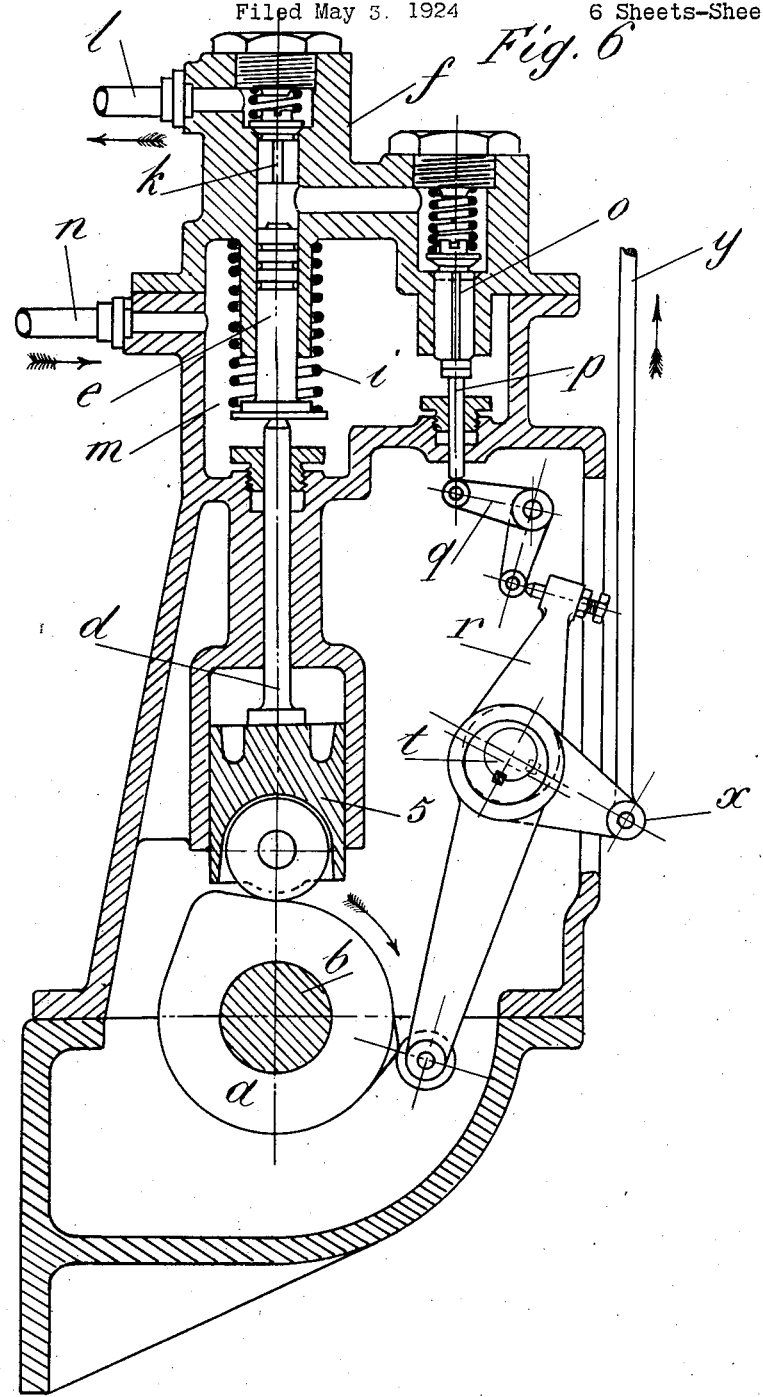

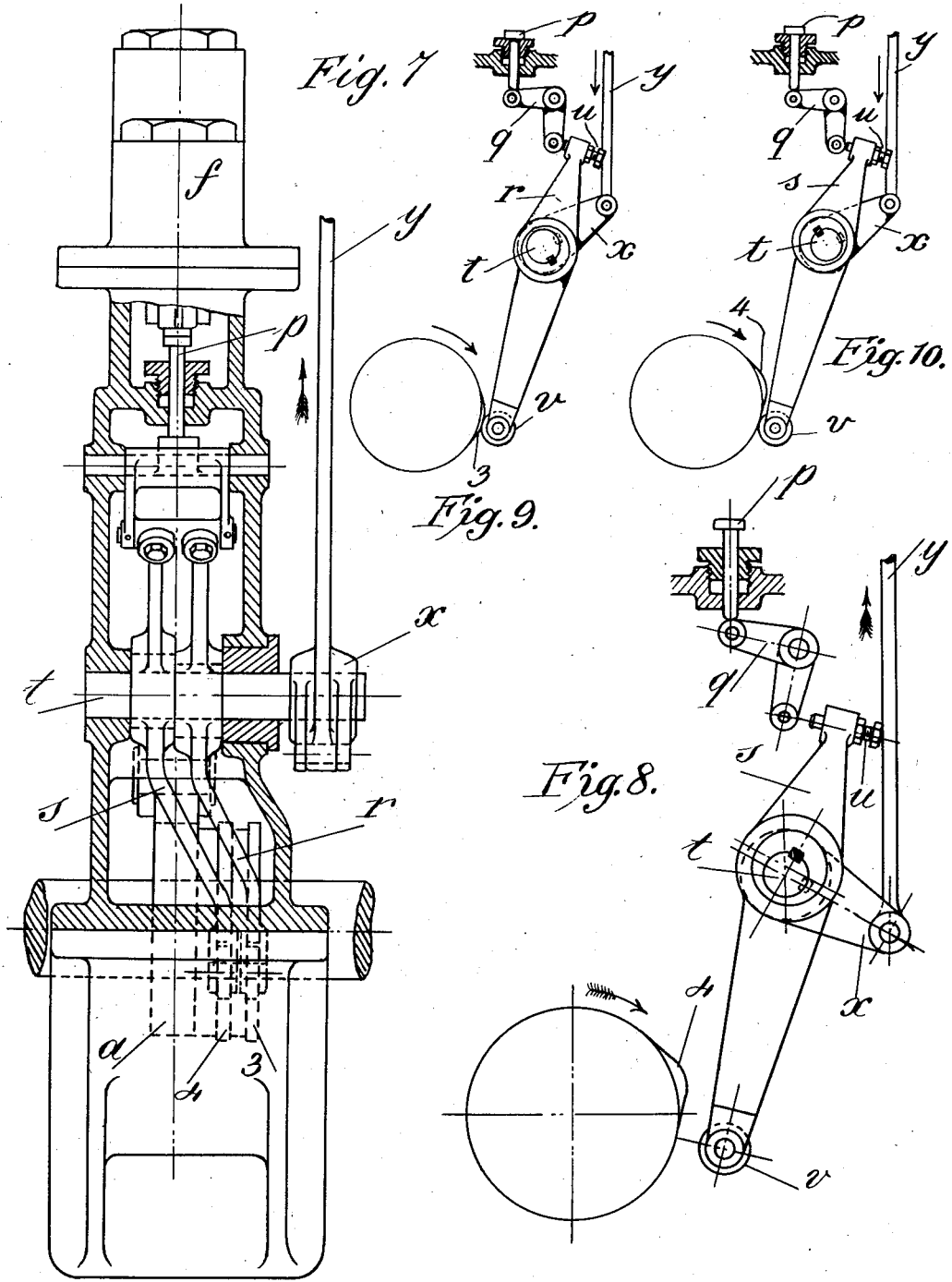

Nov. 23, 1926.  
A. FRANCHETTI  
1,608,095  
FUEL PUMP FOR INTERNAL COMBUSTION ENGINES  
Filed May 3, 1924  6 Sheets-Sheet 6
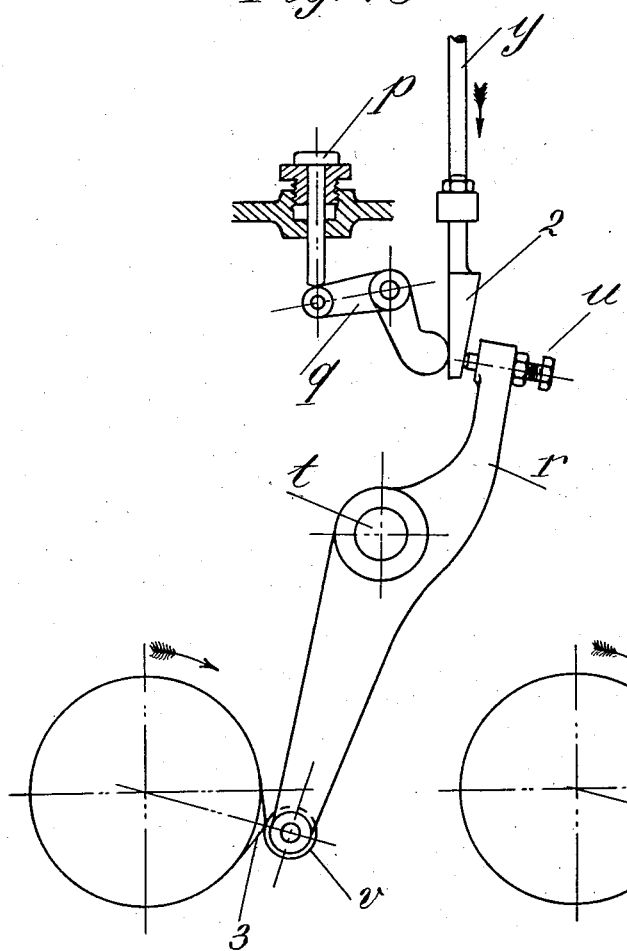
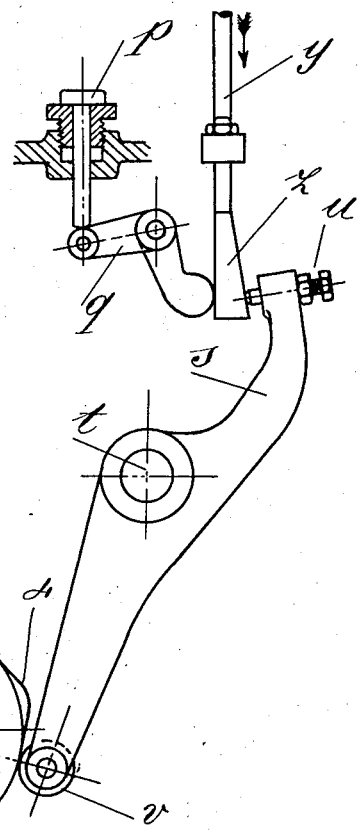
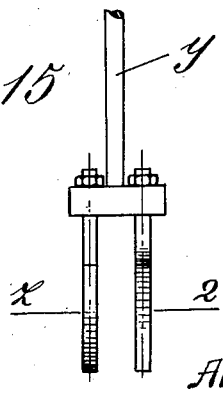
Inventor  
Alessandro Franchetti.  
per *Powers*  
Attorney.

Patented Nov. 23, 1926.

1,608,095

UNITED STATES PATENT OFFICE.

ALESSANDRO FRANCHETTI, OF FLORENCE, ITALY.

FUEL PUMP FOR INTERNAL-COMBUSTION ENGINES.

Application filed May 3, 1924. Serial No. 710,712.

The invention forming the subject of the present application is applicable to that class of internal combustion engines having the fuel directly injected into the combustion chamber. Its main purpose consists in providing an efficient and simple device in order to change simultaneously and in accordance with the load of the engine, the amount of fuel and the timing and duration of the injection.

The said regulation is under the control of a centrifugal governor and can also be adjusted while the engine is running by simply altering the setting of two regulating screws.

In accordance with this invention, the regulation of both the closing and the reopening of the overflow valve is effected by curve-shaped members, oscillating noses or rotatable cams, and not directly by the upward movement of the pump plunger, so that the opening and closing speed can be changed, to get the best results, by altering the shape of said curved members. The two levers that regulate the injection are carried on a common shaft, so that the device is simple and compact. Furthermore both levers remain within sight of the engineer and side by side, thus facilitating a further adjustment by means of set screws, as will be hereinafter described.

In the accompanying drawings is shown an example of a mechanism embodying the said invention.

Fig. 2 is an external view, partly in section.

Figs. 3, 4 and 5 represent details of the regulation in various positions.

Figs. 6 and 7 are views corresponding to Figs. 1 and 2 but showing a modification of the piston-driving mechanism.

Figs. 8, 9 and 10 show details of the various regulating positions corresponding to the form shown at Figs. 6 and 7.

Figs. 11-15 show the various regulating positions, according to a third form of the mechanism.

Figure 1:
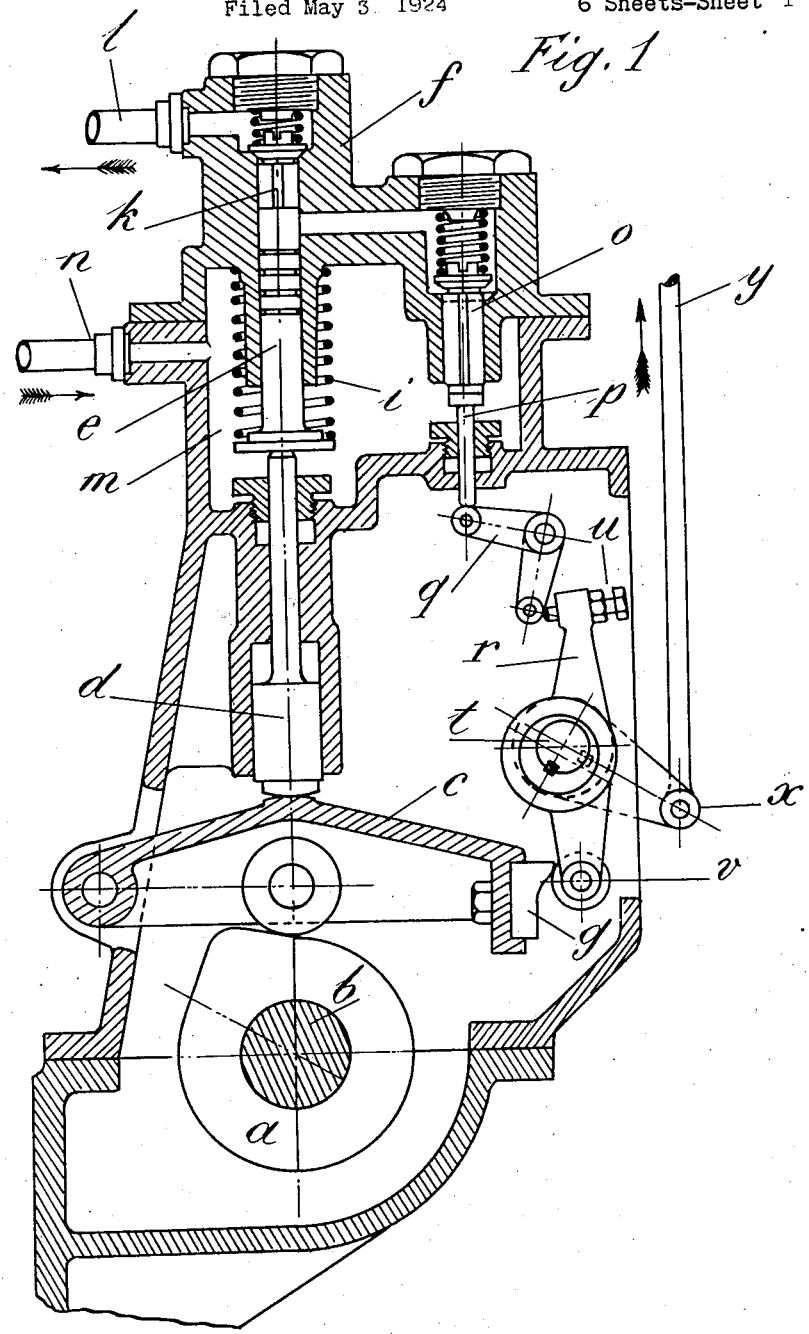
Fig. 1 is a central vertical section.

Referring more particularly to Figs. 1 to 5, —a— represents a rotatable cam, preferably mounted on the engine camshaft —b—. The said cam acts through a lever —c— and a pushing-rod —d—, upon the piston —e— of the fuel pump —f—.

The said piston —e— is preferably ground to exact size to avoid the necessity of a stuffing box, and the hole of the pump and of the operating device is supported by a suitable frame.

The end of the lever —c— opposite to its fixed fulcrum is provided with the noses or cams —g— and —h—, to act upon the regulating device.

The piston —e— is provided with a spring —i— to effect its downward stroke. The pump —f— is provided with a discharge valve —k— connected by the pipe —l— with the spray valve of the engine.

The fuel fills the tank —m— and is permanently fed thereto by the inlet pipe —n—.

—o— is the suction valve of the pump. The same acts also as overflow or return valve, and it is shown acting in such way; but ordinarily a special smaller valve may be provided for this purpose.

The valve —o— is operated by a push rod —p— extending through the bottom of the tank —m—.

The rod —p— is operated by the upper arm of the angle-lever —q— having its lower arm of sufficient width to be operated by two levers —r— and —s— arranged side by side and fulcrumed on two eccentric sheaves keyed to the shaft —t—.

The levers —r— and —s— have regulating set screws —u— on their upper ends to alter the play with the lever —q— and have rollers —v— on their lower ends acted upon by the noses —g— and —h—.

The shaft —t— through the lever —x— and the rod —y— may be rotated by the centrifugal governor of the engine.

In the Figs. 1, 2 and 3 the lever —x— is in the lowest position corresponding to the full load of the engine, and the eccentric sheave of the lever —r— is in its farthest position towards the left, while the eccentric sheave of the lever —s— is in its farthest position toward the right, both eccentrics being set with their centres diametrically opposed to each other with respect to the axis —t—.

In Figs. 4 and 5 the lever —x— is in its highest position corresponding to no load of the engine and the position of the two squarely against the inner or bottom wall of the said socket. The operator then uses a hammer, striking the outer plug in the direction of the length of the axle whereby the wheel is jarred loose from the axle and the key thereof and may be quickly removed.

Having described the invention what is claimed is—

A device adapted to be used for removing a wheel from an axle upon which it is keyed comprising a body provided at its opposite ends with alined sockets of different sizes, and anvil plugs fitting in the sockets.

In testimony whereof I affix my signature.

CASH A. CLEMONS.

the previous instance, the cam —3— controls the beginning of the injection, and the cam —4— the end thereof.

I claim:—

1. Governor controlled apparatus for fuel injection in an internal combustion engine, comprising a cam-operated plunger pump, an overflow valve, two levers operated during the pressure stroke of the pump, means for operating said two levers, two curved-shaped members interposed between the said operating means and the two levers, a common member acting between both said levers and the return valve, a common shaft carrying both levers, and means for simultaneously regulating the action of the said two levers from the governor.

2. Governor controlled apparatus for fuel injection in an internal combustion engine, comprising a cam-operated plunger pump, an overflow valve, two levers operated during the pressure stroke of the pump, a lever operating the pump plunger, two noses mounted on the free end of the said operating lever and operating the said two levers, a third lever acting upon the return valve and actuated by said two levers, a comomn rotatable shaft, two eccentric sheaves mounted on the common shaft and carrying said two levers, and means for controlling the said shaft from the governor.

3. Governor controlled apparatus for fuel injection in an internal combustion engine, comprising a cam-operated plunger pump, an overflow valve, two levers operated during the pressure stroke of the pump, means for operating said two levers, two curve-shaped members interposed between the said operating means and the two levers, a common member acting between both said levers and the return valve, a common shaft carrying both levers, means for simultaneously regulating the action of the said two levers from the governor, and additional means for regulating the beginning and the end of the fuel injection periods comprising a set screw adjustably mounted on the end of each of said two levers.

ALESSANDRO FRANCHETTI.